United States Patent [19]
Kirk

[11] Patent Number: 5,888,388
[45] Date of Patent: Mar. 30, 1999

[54] WATER TREATMENT

[75] Inventor: Christopher Peter Kirk, Walton on Thames, United Kingdom

[73] Assignee: Pet Mate Limited, Surrey, United Kingdom

[21] Appl. No.: 839,178

[22] Filed: Apr. 23, 1997

[51] Int. Cl.$^6$ .................................................. C02F 1/32
[52] U.S. Cl. .......................... 210/170; 210/255; 210/262; 250/434; 422/186.3
[58] Field of Search .................................. 210/169, 170, 210/150, 151, 192, 198.1, 255, 259, 262, 748; 250/434; 422/186.3

[56] References Cited

U.S. PATENT DOCUMENTS

| | | | |
|---|---|---|---|
| 3,661,262 | 5/1972 | Sanders | 210/169 |
| 4,297,222 | 10/1981 | Takeguchi et al. | 210/169 |
| 5,089,137 | 2/1992 | McKown | 210/150 |
| 5,227,053 | 7/1993 | Brym | 210/748 |
| 5,494,576 | 2/1996 | Hoppe et al. | 210/748 |
| 5,653,877 | 8/1997 | Mark | 210/259 |

*Primary Examiner*—Jay H. Woo
*Assistant Examiner*—Betsey J. Morrison
*Attorney, Agent, or Firm*—Young & Thompson

[57] ABSTRACT

A filtration unit e.g. for ponds comprises a housing divided into a radiation chamber (18) with a water inlet (20) and a filtration chamber (19) with water outlets (21,22). A weir (23) in the partition wall (17) between the chambers controls the water level in the radiation chamber (18). One or more UV tubes (25,26) are mounted in the radiation chamber (18) above the water level therein controlled by the weir (23). Preferably the housing has a cover which is in two parts a first (33) of which extends over the radiation chamber (18) and is secured by screws or the like so that it cannot be removed inadvertently, and the second (34) of which extends over the filtration chamber (19) and is hinged to give ready access to the filtration chamber (19).

15 Claims, 2 Drawing Sheets

WATER TREATMENT

FIELD OF THE INVENTION

This invention relates to water treatment and more particularly to the treatment of standing water, such as in a pond, by irradiation and preferably also by filtration.

BACKGROUND OF THE INVENTION

Stationary or re-circulating water in the open air, such as the water in an ornamental pond, will normally require treatment to preserve its purity and translucency. Irradiation by ultra-violet light is effective to prevent the development of algae and a filter is desirable to remove plant decomposition products such as ammonia and nitrite, the dead algae and other impurities.

PRIOR ART

In prior art proposals such as British Patent Specifications Nos. 2237488 and 2264295 water to be treated by exposure to ultra-violet light is passed around the source of light. Effectively the source of light, namely a gas-filled tube, is immersed in the water. This maximizes the exposure to light of the water but presents serious problems in protecting the gas-filled tube from the water and providing a safe, waterproof assembly. In such prior art proposals the gas-filled tube is protected by an outer sheath of quartz, sealed at its opposite ends to prevent water ingress. This quartz sheath is an expensive item and the complexity of the assembly makes changing the gas-filled tube a difficult operation which, unless expertly carried out, may give rise to breakages or water ingress.

The present invention proceeds from the discovery that pond water can be treated satisfactorily by a source of ultra-violet light which is not immersed in the water being treated but rather suspended above it. This permits expensive shielding such as a quartz tube to be dispensed with and makes changing a gas-filled tube a much simpler and less hazardous operation.

SUMMARY OF INVENTION

In accordance with the present invention there is provided a unit for algae elimination in ornamental ponds which comprises a container, means for passing water to be purified through the container, means for normally maintaining a predetermined water level in the container and a source of ultra-violet light suspended above said water level, the arrangement being such that light from said source passes directly to the water in the container without passage through any waterproof shielding or the like associated with said source.

In a preferred construction the container has a bottom and side and end walls upstanding from the bottom and said means for normally maintaining a predetermined water level in the container comprises weir means in the upper region of one of said walls providing an overflow from the container.

The weir means may comprise a cut out in said upper wall region which increases in width vertically upwardly so that as the water level rises a greater volume of water is permitted to overflow. At least one side of said cut out may have a stepped configuration.

The source of ultra-violet light may be mounted in a removable cover for the container, and a gap may be provided between upper edges of walls of the container and the cover, when the cover is positioned over the container, through which water may overflow in the event of failure to do so of said means for maintaining a normal water level in the container, such that in the event of such failure the water level is prevented from rising to the source of ultra-violet light.

The source of ultra-violet light ray be an elongated gas-filled glass tube and the cover may have spaced apart, resilient mountings for opposite ends of the tube.

The means for passing water through the container way comprise a water inlet in a lower region of the container and a diffuser positioned within the container to deflect water entering the container through the inlet such as to prevent a linear flow of water through the container.

The container may be a radiation chamber associated in the same unit with a filtration chamber, the arrangement being such that water treated in the radiation chamber passes to and through the filtration chamber.

The unit may comprise a housing having a bottom, side and end walls and an openable cover, a partition wall within the housing extending between the end walls in spaced relation to the side walls to divide the interior of the housing into said radiation chanter and said filtration chamber, weir means in the upper region of the partition wall to control the water level in the radiation chamber, water inlet means arranged to admit water to be treated to a lower region of the radiation chamber, and water outlet means arranged for the discharge of treated water from the filtration chamber at a position spaced therealong from the weir means.

The housing may have a cover which is in two parts a first of which extends over the radiation chamber and is secured by screws or the like so that it cannot be removed inadvertently and the second of which extends over the filtration chamber and is hinged to give ready access to the filtration chamber.

The first part of the cover is preferably of inverted channel section, having an outwardly-extending peripheral flange at the free ends of the walls of the channel and there may be provided within the first part of the cover a lamp mounting also of inverted channel section but shallower than the channel of the cover, the mounting also having at the free ends of its walls an outwardly-extending peripheral flange and the arrangement being such that the flanges of the cover part and of the lamp mounting may be secured by common screws to top edges of the walls of the housing.

The lamp mounting may be of a light-reflective material such as of a plastics material covered by an aluminum foil reflector.

The bottom of the filtration chamber may be covered by a layer of a particulate biological filtration medium and said layer of particulate biological filtration medium may be covered by a layer of sponge-like material, the upwardly presented surface of which undulates between peaks and troughs to maximize the surface area of the sponge-like material over which water in the filtration chamber will pass.

The layer of sponge-like material may be integral so as to be removable in one piece, e.g. for cleaning, after opening the hinged part of the cover.

BRIEF DESCRIPTION OF THE DRAWINGS

A preferred embodiment of the invention will now be described by way of non-limitative example with reference to the accompanying drawings, in which.

DESCRIPTION OF THE PREFERRED EMBODIMENT

Figure 1:
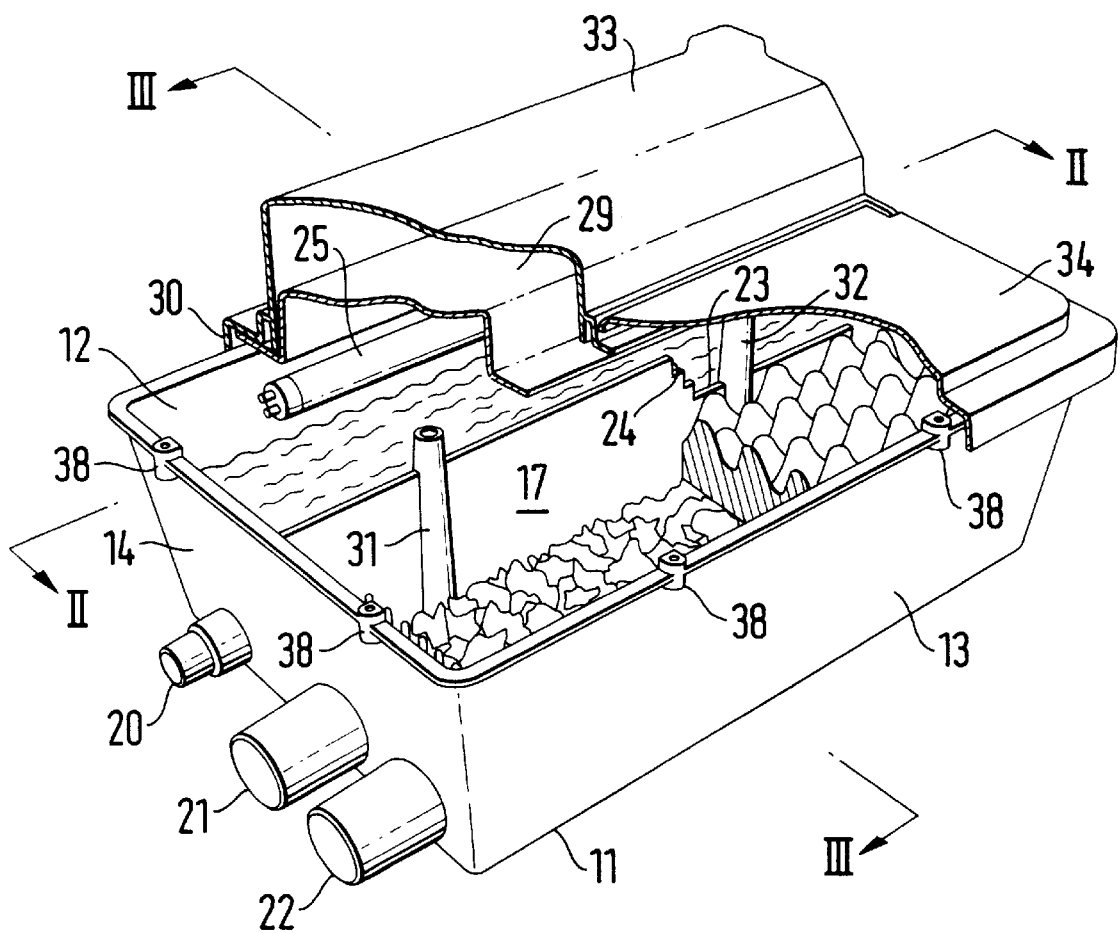
FIG. 1 is a perspective view of the unit of the invention with parts broken away.
Figure 2:
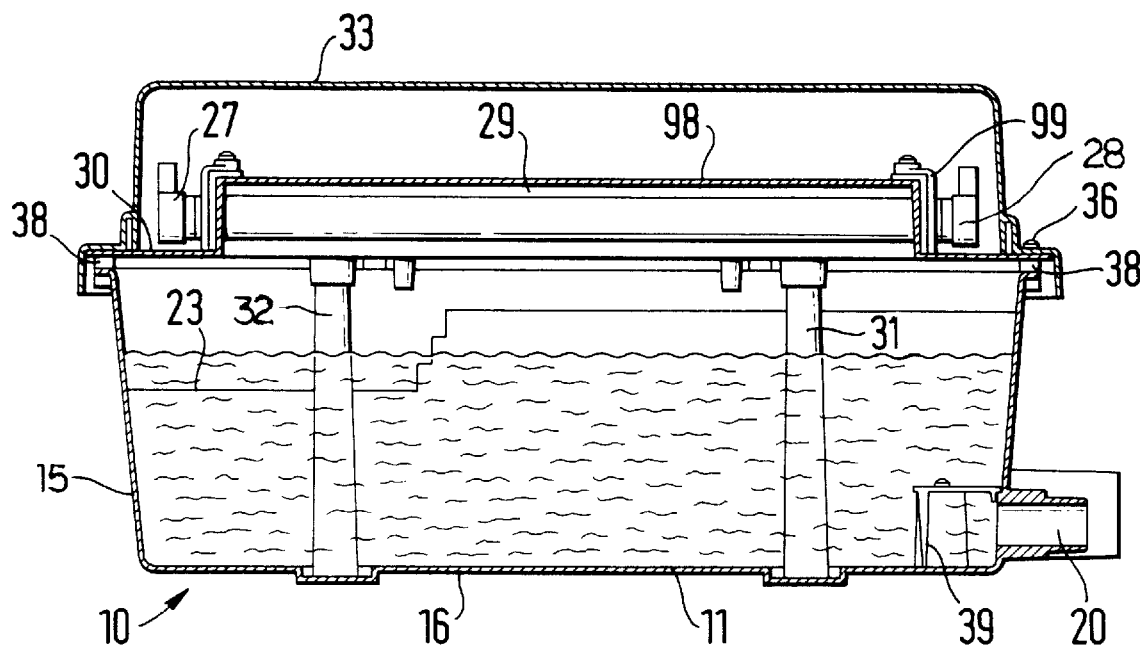
FIG. 2 is a longitudinal sectional elevation on the line II—II of FIG. 1.
Figure 3:
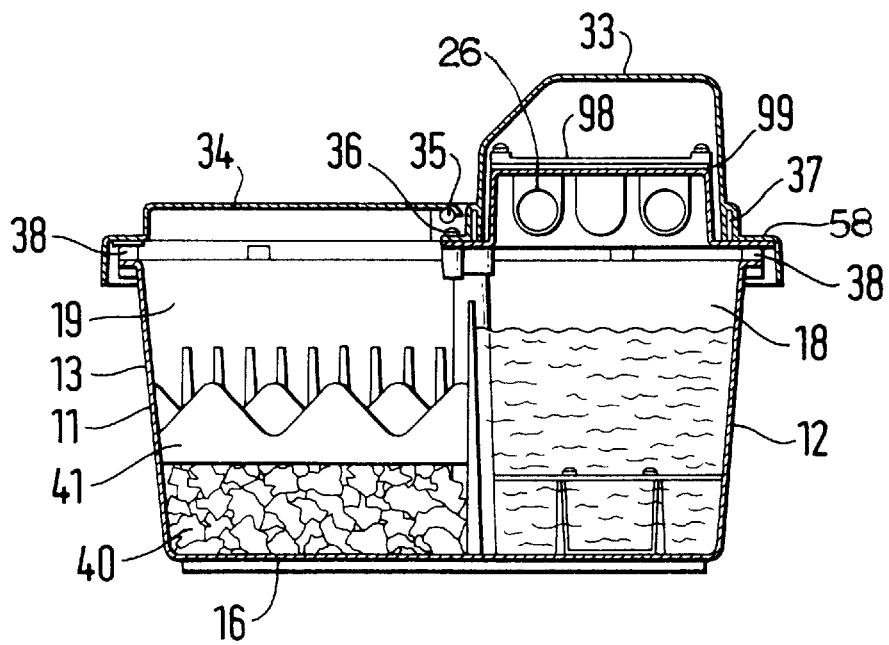
FIG. 3 is a cross-sectional elevation on the line III—III of FIG. 1.

The pond water filtration unit 10 shown comprises an open-topped, trough-like housing 11 having side walls 12 and 13 and end walls 14 and 15 upstanding from a bottom 16. A partition wall 17 extends between the end walls 14 and 15 in spaced relation to the side walls 12 and 13 so as to divide the interior of the housing into a radiation chamber 18 and a filtration chamber 19. Penetrating the end wall 14 is a water inlet 20 opening to a lower region of the radiation chamber 18 and a pair of water outlets 21 and 22 opening to a lower region of the filtration chamber 19. Suitable hoses (not shown) conduct water to be treated, e.g. from a pond, to the inlet 20 and return the treated water to the pond from the outlets 21 and 22. A suitable pump (not shown) is located on the inlet side to maintain a flow of water through inlet 20 into the housing 11.

Water overflows from the radiation chamber 18 into the filtration chamber 19 over a weir 23 formed by cutting away an upper region of the partition wall 17. This cut away area has a lateral edge 24 of a stepped configuration. This provides graduations enabling a visual check to be made on the water level in the filtration chamber and moreover because the width of the weir increases upwardly it permits more water to flow over it as the water level rises. This will assist in maintaining a constant throughput of water and in preventing the chambers from over or under-filling. It is to be noted that the weir 23 is at the end of the partition 17 remote from end wall 14, so that water flowing over it must pass along the whole length of the filtration chamber before reaching the outlets 21 and 22.

In the radiation chamber 18 the water to be treated is subjected to radiation from ultra violet lamps 25 and 26. Two are shown but it is to be understood that a greater or lesser number may optionally be used. It is to be noted that the lamps, or each of them, are unshielded for example by a quartz tube such as has hitherto been considered necessary to waterproof the light source in a water radiation system. Instead light from the lamps 25 and 26 passes directly to the water being treated. End fittings such as 27 and 28 for the lamp(s) penetrate opposite end walls of a mounting 29 of inverted channel section fabricated from a plastics material covered on the inner side with aluminum foil as a reflector. The lamps are supported by screws which pass through a plate 98 which is separated from the mounting 29 by a foam rubber layer 99. This provides a water-tight seal and protects the lamps from damage in transit. The mounting 29 has a peripheral flange 30 extending outwardly from the free ends of its four walls by which it rests on a number of small pillars 38 distributed around the side wall 12 and end walls 14 and 15 of the housing 11 and additionally two columns 31 and 32 upstanding from the bottom 16 of the housing. The partition 17 intersects these columns but is of lesser height.

The housing 11 as a whole is lidded by a cover which is in two parts, one 33 of which extends over the radiation chamber 18 and the other 34 of which extends over the filtration chamber 19, where it is supported by more of the small pillars 38 above walls 13, 14 and 15. The cover part 34 is hinged at 35 to the cover part 33 so that it can be raised and lowered, without disturbing the cover part 33, to gain access to the filtration chamber 19. When it is desired to gain access to the radiation chamber 18 screws 36 must be undone. Some of these releasably secure the mounting 29 jointly with the cover part 33 to the upper edge of the housing 11 and to the columns 31 and 32 while the remainder serve additionally to secure to the upper edge of the housing a gasket 37 which lies all around the chamber 18 to electrically isolate the lamp mountings. The apertures between the pillars 38 provide for emergency overflow of water from both chambers of the housing even when the cover part 33 is screwed in place and the cover part 34 is closed.

The cover part 33 is of inverted channel section with a peripheral flange 58 extending outwardly from the free ends of its walls. In use the flange 58 extends over the flange of the lamp mounting 29 and is commonly secured by the screws 36. The channel of the cover part 33 is considerably deeper than the channel of the lamp mounting 29 with the result that a space exists between the two in which wiring, etc. for the lamp(s) can be accommodated.

By this arrangement all electrical components are located well above the water level in the radiation chamber and in such a way that they will not be accessed inadvertently, e.g. when the cover part 34 is opened. On the other hand when it is desired to access them and the appropriate screws 36 are removed for the purpose the replacement of a failed UV tube, for example, is a simple matter. Both sides of the lamp mounting 29 are accessible because the cover part 33 is separable from it.

A barrier-like element 39 is located in the radiation chamber immediately in front of the inlet 20 to divert the incoming water and prevent an undesirable linear flow through the radiation chamber.

The bottom of the filtration chamber is covered by a particulate biological filter medium 40. This in turn is covered by a layer 41 of sponge-like material such as a synthetic foamed rubber. As is known per se the top surface of this layer 41 is undulant between peaks and troughs to maximize the surface area of the layer which is exposed to the water above and passing over it. The layer 41 is preferably provided by a single, integral piece of material which can be bodily removed for cleaning simply by hinging open the cover part 34.

I claim:

1. A unit for algae elimination in ornamental ponds comprising:

a container divided by a partition wall into separate water radiation and filtration chambers;

means for passing water to be treated through the container;

means for maintaining a predetermined water level in the radiation chamber;

and a source of ultra-violet light suspended above said water level, wherein in use, light from said source directly irradiates the water in the radiation chamber; and wherein the means for maintaining a predetermined water level in the radiation chamber comprises a weir provided by an upper edge of the partition wall over which the water in the radiation chamber flows into the filtration chamber as it passes through the container.

2. A unit as claimed in claim 1, wherein the container has a bottom and side and end walls upstanding from the bottom.

3. A unit as claimed in claim 1, wherein the weir comprise a cut out in said upper edge of the partition wall which increases in width vertically upwardly so that as the water level rises a greater volume of water is permitted to overflow.

4. A unit as claimed in claim 3, wherein at least one side of said cut out has a stepped configuration.

5. A unit as claimed in claim 1, wherein said source of ultra-violet light is mounted beneath a cover for the container, and wherein a gap is provided through which water may overflow in the event that the means for maintaining a predetermined water level in the container fail, whereby the water level is prevented from rising to the source of ultra-violet light.

6. A unit as claimed in claim 5, wherein the cover is removable and wherein the gap is between upper edges of walls of the container and the cover, when the cover is positioned over the container.

7. A unit as claimed in claim 6, wherein the source of ultra-violet light is an elongated gas-filled glass tube and wherein the cover has spaced apart, resilient mountings for opposite ends of the tube.

8. A unit as claimed in claim 1, wherein the means for passing water through the container comprises a water inlet in a lower region of the container and a deflector positioned within the container to deflect water entering the container through the inlet such as to prevent a linear flow of water through the container.

9. A unit as claimed in claim 1, and comprising a housing having a bottom, side and end walls and an openable cover, the partition wall within the housing extending between the end walls in spaced relation to the side walls to divide the interior of the housing into said radiation chamber and said filtration chamber, water inlet means arranged to admit water to be treated to a lower region of the radiation chamber, and water outlet means arranged to discharge treated water from the filtration chamber at a position spaced therealong from the weir.

10. A unit as claimed in claim 9, wherein the housing has a cover which is in two parts, a first part which extends over the radiation chamber and is secured by fastening means so that the first part cannot be removed inadvertently and a second part which extends over the filtration chamber and is hinged to give ready access to the filtration chamber.

11. A unit as claimed in claim 10, wherein the first part of the cover is an inverted channel section, having an outwardly-extending peripheral flange at the free ends of the walls of the channel and a lamp mounting also of inverted channel section but shallower than the channel of the cover being provided within the first part of the cover, the mounting also having at the free ends of its walls an outwardly-extending peripheral flange, and the flanges of the cover part and of the lamp mounting adapted to be secured by common screws to top edges of the walls of the housing.

12. A unit as claimed in claim 11, wherein the lamp mounting is of a light plastics material covered by an aluminum foil reflector.

13. A unit as claimed in claim 9, wherein the bottom of the filtration chamber is covered by a layer of a particulate biological filtration medium.

14. A unit as claimed in claim 13, wherein the layer of particulate biological filtration medium is covered by a layer of sponge-like material having an upper surface which undulates between peaks and troughs to maximize the surface area of the sponge-like material over which water in the filtration chamber will pass.

15. A unit as claimed in claim 14, wherein the layer of sponge-like material is integral so as to be removable in one piece after opening a hinged part of the cover.

* * * * *